(12) United States Patent
Laurisch et al.

(10) Patent No.: US 7,577,331 B2
(45) Date of Patent: Aug. 18, 2009

(54) OPTICAL FIBER COUPLER MODULE

(75) Inventors: Steffen Laurisch, Grunheide (DE); Klaus Klein, Berlin (DE); Hans-Peter Sandeck, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/553,521

(22) PCT Filed: Mar. 26, 2004

(86) PCT No.: PCT/EP2004/003232

§ 371 (c)(1),
(2), (4) Date: Oct. 13, 2006

(87) PCT Pub. No.: WO2004/092797

PCT Pub. Date: Oct. 28, 2004

(65) Prior Publication Data

US 2007/0154158 A1 Jul. 5, 2007

(30) Foreign Application Priority Data

Apr. 16, 2003 (DE) .................................. 103 17 620

(51) Int. Cl.
*G02B 6/00* (2006.01)

(52) U.S. Cl. ........................ 385/135; 385/134; 385/136; 385/137

(58) Field of Classification Search .................. None
See application file for complete search history.

(56) References Cited

U.S. PATENT DOCUMENTS

| 6,192,180 | B1 | 2/2001 | Kim et al. | |
|---|---|---|---|---|
| 6,418,262 | B1 | 7/2002 | Puetz et al. | |
| 6,424,781 | B1* | 7/2002 | Puetz et al. | 385/135 |
| 2002/0051616 | A1* | 5/2002 | Battey et al. | 385/135 |
| 2002/0181922 | A1* | 12/2002 | Xin et al. | 385/135 |

FOREIGN PATENT DOCUMENTS

| DE | 41 19 829 | 12/1992 |
|---|---|---|
| DE | 42 30 418 | 3/1994 |
| DE | 43 08 228 | 10/1994 |
| DE | 195 08 775 | 9/1996 |
| DE | 297 19 095 | 3/1998 |
| DE | 299 01 931 | 8/2000 |
| DE | 199 43 191 | 4/2001 |
| DE | 201 15 940 | 2/2002 |
| DE | 101 13 528 | 9/2002 |

(Continued)

*Primary Examiner*—Sung H Pak
*Assistant Examiner*—Chad H Smith
(74) *Attorney, Agent, or Firm*—Merchant & Gould P.C.

(57) ABSTRACT

The invention relates to a glass-fiber coupler module, comprising a cassette mount, which is connected to a front panel, the cassette mount being assigned a coupler, by means of which the signals of at least one incoming glass fiber are distributed over at least two outgoing glass fibers, a first group of couplings and a second group of couplings, the second group of couplings being arranged on the front panel, glass fibers from the first group of couplings being passed into the coupler and the outgoing glass fibers from the coupler being connected to the second group of couplings, the first group of couplings being arranged on a mounting panel, and the mounting panel being arranged on the cassette mount such that it can pivot.

12 Claims, 4 Drawing Sheets

FOREIGN PATENT DOCUMENTS

| | | |
|---|---|---|
| EP | 0 531 628 | 3/1993 |
| EP | 0 617 304 | 9/1994 |
| JP | 9-236709 | 9/1997 |
| JP | 2002-236219 | 8/2002 |
| WO | WO 00/05611 | 2/2000 |

* cited by examiner

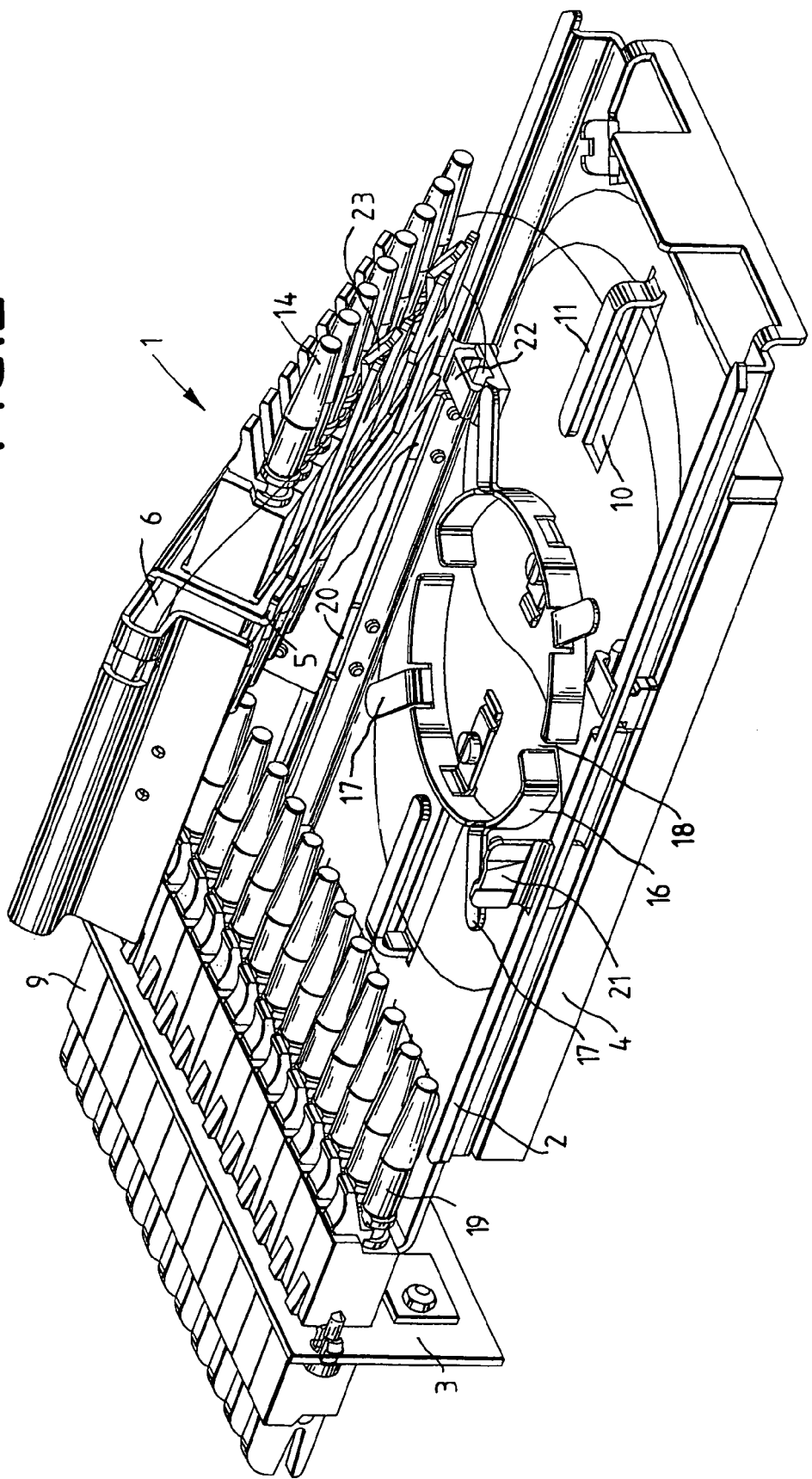

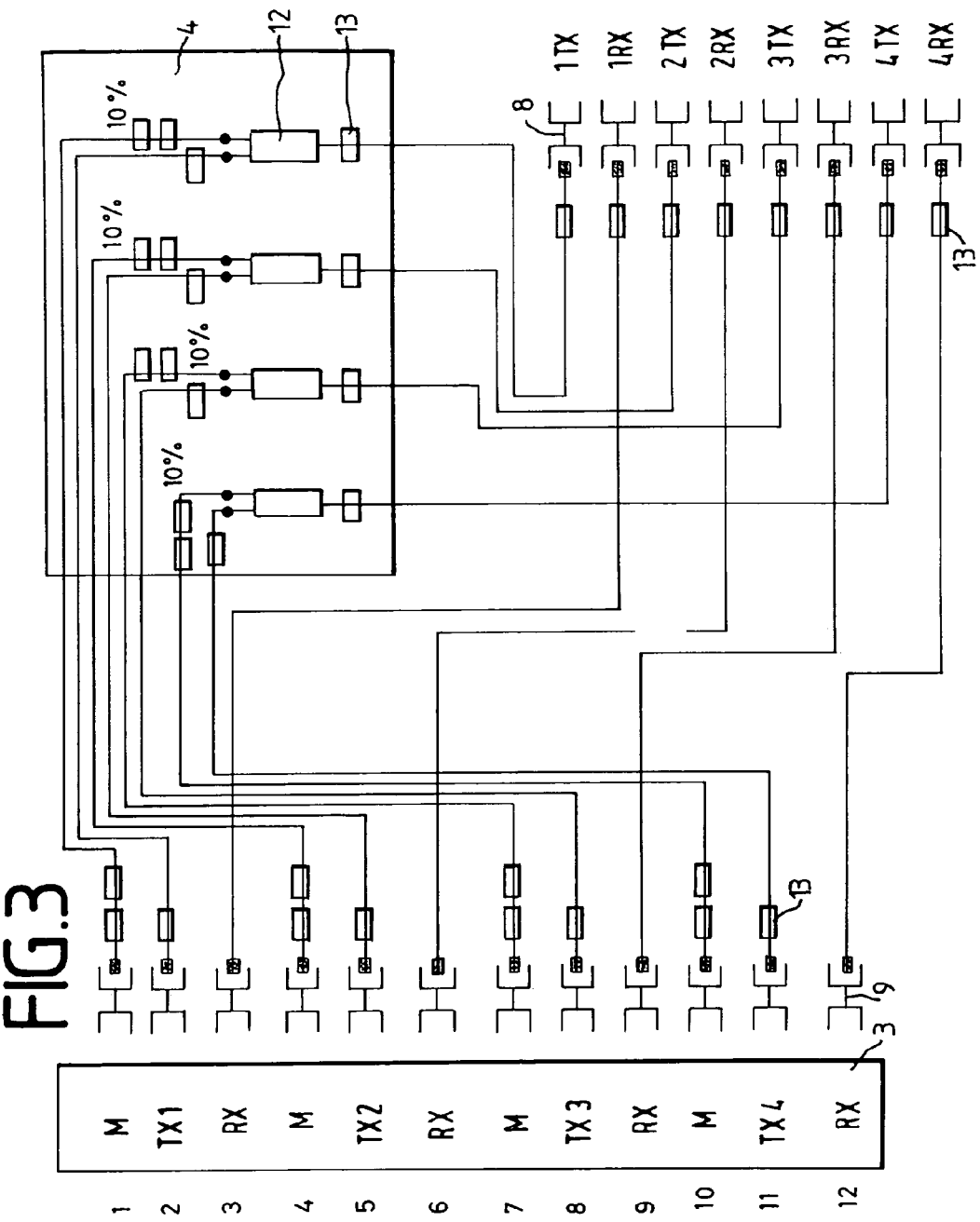

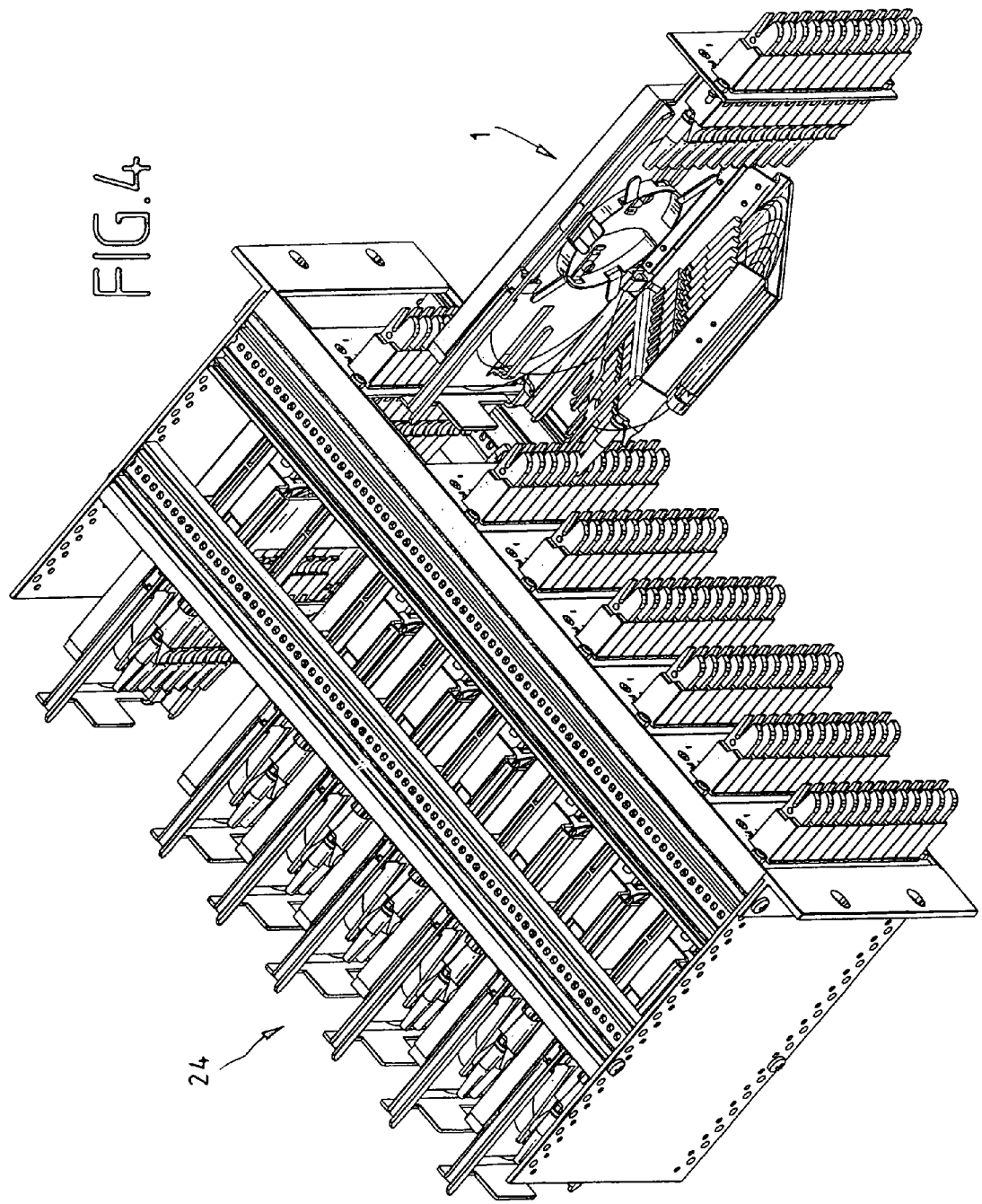

OPTICAL FIBER COUPLER MODULE

BACKGROUND

The invention relates to a glass-fiber coupler module as claimed in the preamble of patent claim 1.

It is increasingly common to wish to use glass-fiber distribution frame inserts with monitoring in glass-fiber distribution frames. The units referred to as coupler modules or monitoring modules are used in 19" mounting racks and can be combined with standard plug modules.

In this regard, it is known for the glass-fiber coupler module to comprise a coupler by means of which the signals of at least one glass fiber are split between at least two outgoing glass fibers, one outgoing glass fiber being used for monitoring purposes. Further, the known glass-fiber coupler modules comprise a first and second group of couplings, the second group of couplings being arranged on the front panel. Plugs coming from the rear of the glass-fiber coupler module are accommodated by the first group of couplings and passed into the coupler via plugs inserted on the opposite side of the coupling. The glass fibers with a plug then run from the coupler to the couplings in the second group. It is often sufficient to monitor only the TX glass fibers. The rear RX glass-fiber plugs are thus inserted directly into the coupling on the front panel. The TX glass-fiber plugs are, on the other hand, inserted into the couplings in the first group and passed via the coupler to the second group of couplings. Owing to the fact that in this manner only half the glass fibers need to be passed to the coupler, the minimum bending radii do not present any problems. One disadvantage of the known glass-fiber coupler module is the maintenance problems associated with it. In the case of glass-fiber coupler modules, after a certain amount of time it is necessary to clean the plugs. Owing to the fact that there is only a small amount of space, it is extremely difficult to remove the plugs inserted in the first and second group of couplings within the housing without the use of a tool. Furthermore, it is nearly impossible to withdraw a plug without touching the adjacent glass fibers and thus influencing their transmission characteristics.

SUMMARY

The invention is therefore based on the technical problem of providing a maintenance-friendly glass-fiber coupler module.

For this purpose, the first group of couplings is arranged on a mounting panel which is arranged on the cassette mount such that it can pivot. This makes it possible for the mounting panel to be pivoted up for maintenance purposes such that the couplings and thus the plugs inserted into the couplings are located on another plane. This makes the plugs in both the first and the second group of couplings freely accessible such that they can be withdrawn, cleaned and reinserted without the need for any tools. The mounting panel can in this case generally be regarded as a suitable mounting body.

In one preferred embodiment, each patch cable coming in from the rear is assigned a coupling in the first group, the couplings preferably all being arranged in a row. The patch cables coming in from the rear of the glass-fiber coupler module are thus simply and easily accessible from the rear, as opposed to the connected-through patch cables of the prior art which are sometimes inserted directly into the couplings in the second group of couplings.

In a further preferred embodiment, all of the couplings in the second group are arranged in a row.

In a further preferred embodiment, elements for accommodating a spare working length of glass fibers are arranged beneath the mounting panel. The spare working lengths make it possible for the plugs to be withdrawn and moved a certain distance away, which considerably simplifies maintenance work.

In a further preferred embodiment, at least one direction-changing element is arranged beneath the mounting panel. This ensures that the glass fibers can be passed into the coupler located below, whilst maintaining the minimum bending radii.

In a further preferred embodiment, the direction-changing element is in the form of an inner limiter. This ensures that when the plugs are withdrawn, the glass fiber, withdrawn from the store containing the spare working length, is not bent with less than the minimum bending radius in the store itself.

In a further preferred embodiment, the inner limiter is provided with at least one retainer. The retainer prevents, in particular, the glass fiber from curling upward when it is pulled and thus from being able to be drawn together above the inner limiter, such that its bending radius is not less than the minimum.

In a further preferred embodiment, cable ducts are arranged on the sides of the mounting panel. The glass fibers can be passed back through these cable ducts from the first group of couplings and into the store region arranged beneath the mounting panel whilst maintaining the minimum bending radii. The glass fibers may likewise be passed back via the cable ducts from the store region or the coupler and be inserted, using plugs, into the couplings in the second group of couplings.

In a further preferred embodiment, the width of the mounting panel with cable ducts is less than or equal to the width of the cassette mount. This makes it possible to use the glass-fiber coupler module according to the invention in standard 19" inserts. The additional cable ducts thus do not increase the overall width of the glass-fiber coupler module, rather the width of the cassette mount which is available anyway is used for routing the glass fibers.

In a further preferred embodiment, a connection part in the form of a panel is arranged between the cable ducts. The connection part on the one hand protects the glass fibers and holds them down and, on the other hand, can be used as a label, for example.

In a further preferred embodiment, the mounting panel to the rear of the cassette panel is provided with V-shaped extensions bent downwards. The V-shaped extensions separate the passed-back glass fibers from the plugs arranged above them in the first group of couplings.

BRIEF DESCRIPTION OF THE DRAWINGS

The invention is explained in more detail below with reference to a preferred exemplary embodiment. In the figures:

FIG. 2 shows a perspective illustration of the glass-fiber coupler module in a pivoted-up position, FIG. 3 shows an outline circuit diagram of the glass-fiber connections of the glass-fiber coupler module, and FIG. 4 shows a perspective illustration of a withdrawn and pivoted-up glass-fiber coupler module in a mounting rack.

DETAILED DESCRIPTION

Figure 1:
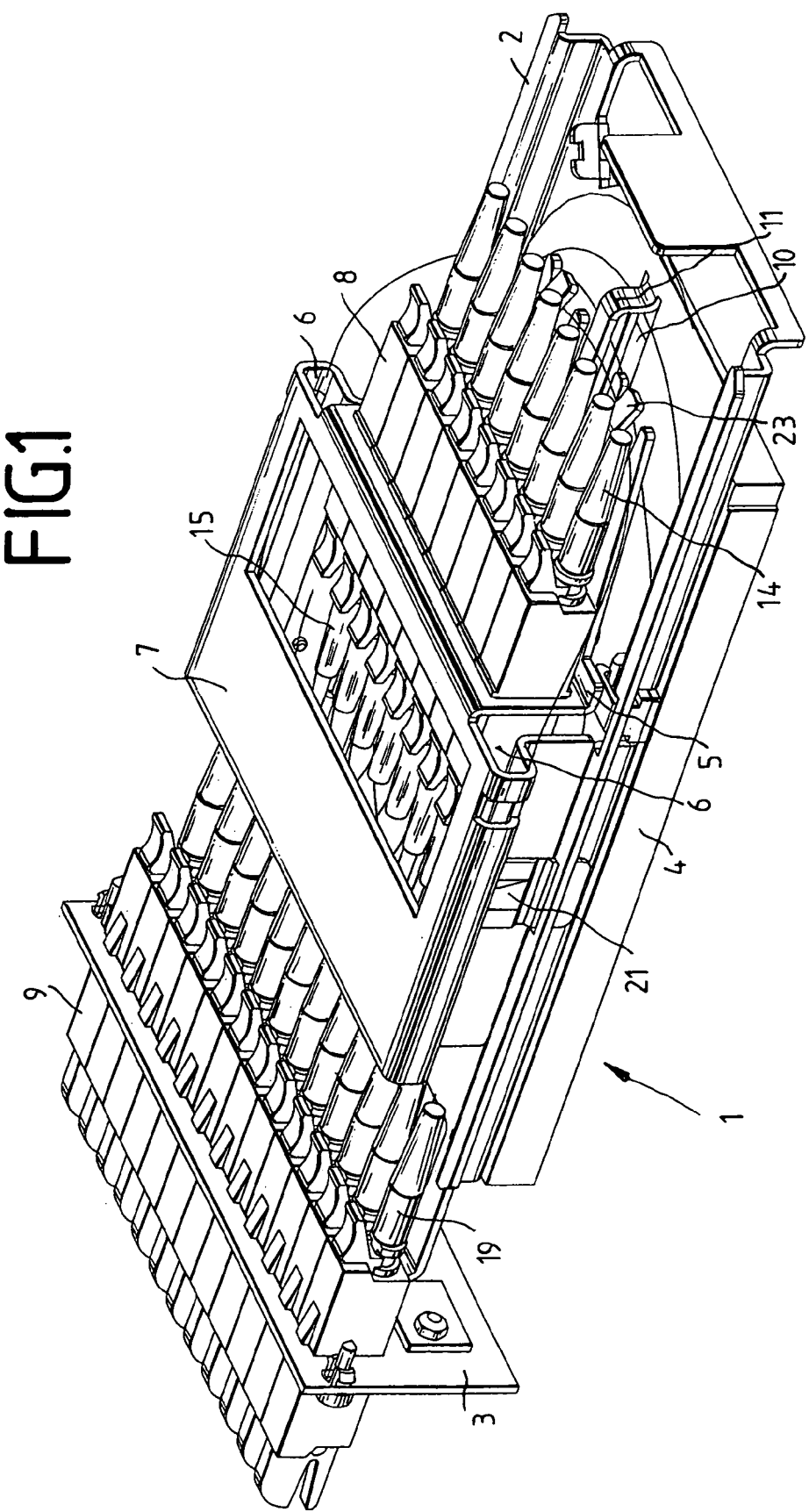
FIG. 1 shows a perspective illustration of a glass-fiber coupler module in the closed state.

FIG. 1 shows the glass-fiber coupler module 1. The glass-fiber coupler module 1 comprises a cassette mount 2 which is connected to a front panel 3. A coupler 4 is arranged beneath the cassette mount 2. A mounting panel 5 is hinged on the cassette mount 2 such that it can pivot. Two cable ducts 6 are arranged on the sides of the mounting panel 5 and a connection part 7 is arranged between these two cable ducts 6. A first group of eight couplings 8 is arranged on the mounting panel 5.

A second group of twelve couplings 9 is arranged on the front panel 3. The cassette mount 2 has a cutout 10 from which a retainer 11 is bent. Before the specific configuration of the glass-fiber coupler module 1 is explained in more detail, the connection of the glass fibers that can be produced in this way will be explained in more detail with reference to FIG. 3.

Eight glass fibers with plugs enter from the rear of the glass-fiber coupler module. In this case, each subscriber is assigned two glass fibers: one for the incoming (RX) and one for the outgoing (TX) signals. These glass-fiber plugs (not shown) are inserted from the rear of the glass-fiber coupler module into the couplings 8. In order to provide monitoring, i.e. monitoring of the glass-fiber connection, the TX glass fibers are passed from the opposite side of the couplings 8 via glass fibers with plugs to the coupler 4. The TX signals are split in the coupler 4 by means of a splitter 12, for example 10% of the light power being coupled into a glass fiber for monitoring purposes. Four incoming glass fibers are thus split up into eight outgoing glass fibers in the coupler 4. If, as shown, no monitoring of the RX glass fibers is provided, these RX glass fibers can be passed via corresponding patch cables from the couplings 8 directly to the couplings 9. The monitoring signals M can then be tapped off by means of plugs inserted from the front of the front panel 3, and can be fed to a monitoring unit. In order to make it easier for the fitter, the individual glass fibers can be identified using colored markings 13. Of course, other types of splitting in the coupler 4 are also possible, for example splitting into three glass fibers. Furthermore, the RX glass fibers may also be included in the monitoring. Likewise, any number of RX and TX glass fibers may be used. Furthermore, a bidirectional glass-fiber connection may also be used.

FIG. 1 shows the plugs 14 inserted from the rear of the glass-fiber coupler module 1 and the outgoing plugs 15 on the first group of couplings 8. The glass fibers arranged on the outgoing plugs 15 are passed back via the cable ducts 6. In this case, the four left-hand glass fibers of the plugs 15 are passed through the right-hand cable duct 6 and the right-hand glass fibers are passed through the left-hand cable duct, which results in a sufficiently large bending radius. A store (shown in FIG. 2) for accommodating a working spare length for the individual glass fibers is located beneath the mounting panel 5. The store comprises an inner limiter 16 having two or more integrated retainers 17. Furthermore, the inner limiter 16 is provided with two openings 18 which, together, form a direction-changing element. The passed-back glass fibers are passed into the store and wound there a number of times. The RX glass fibers are then passed out and inserted into the associated coupling 9 via plugs 19. The TX glass fibers are initially passed into the coupler 4 above after winding and the glass fibers split up by the splitters are passed out again. Subsequently, the glass fibers coming from the coupler 4 are then passed into the coupling 9 by means of the plugs 19. The winding direction of the individual glass fibers can be reversed by means of the direction-changing element such that they can be passed into the coupler 4 with a sufficiently large bending radius. This is particularly the case for individual glass fibers which need to be passed into the coupler 4.

As can further be seen in FIG. 2, the mounting panel 5 with the couplings 8 located on it is hinged on the cassette mount 2 by means of two hinges 20. A locking element 21 is arranged on the opposite side of the cassette mount 2 to the hinges 20. Furthermore, guide elements 22 for the glass fibers are arranged in the store. The mounting panel 5 is provided with extensions in the form of webs in the region of the plugs 14, the extensions 23 in the form of webs being bent back downwards to form a V shape. This prevents the glass fibers coming from the cable duct 6 and those passed back into the cable duct 6 from coming into contact with the plugs 14 and the glass fibers connected to them.

As can be seen from FIG. 2 in conjunction with FIG. 4, a glass-fiber coupler module 1 arranged in a mounting rack 24 can be withdrawn and the mounting panel 5 can be pivoted up. In this pivoted-up position, the plugs 14, 15 and 19 and, if necessary, the plugs inserted from the front of the front panel are now each freely accessible. The plugs 14, 15, 19 can now be withdrawn, for example, for maintenance purposes and cleaned. When withdrawing the plugs 15 and 19, the fitter now has the working spare length of the glass fibers in the store at his disposal so that the plugs 15, 19 can accordingly be physically removed from the couplings 8, 9.

LIST OF REFERENCE NUMERALS

1 Glass-fiber coupler module
2 Cassette mount
3 Front panel
4 Coupler
5 Mounting panel
6 Cable ducts
7 Connection part
8 Couplings
9 Couplings
10 Cutout
11 Retainer
12 Splitter
13 Colored markings
14 Plugs
15 Plugs
16 Inner limiter
17 Retainer
18 Openings
19 Plugs
20 Hinges
21 Locking element
22 Guide element
23 Extension
24 Mounting rack

The invention claimed is
1. A glass-fiber coupler module, comprising:
a cassette mount, which is connected to a front panel that is substantially perpendicular to the cassette mount, the cassette mount being assigned a coupler, by means of which the signals of at least one incoming glass fiber are distributed over at least two outgoing glass fibers, a first group of couplings and a second group of couplings, the second group of couplings being arranged on the front panel, glass fibers from the first group of couplings being passed into the coupler and the outgoing glass fibers from the coupler being connected to the second group of couplings, wherein the first group of couplings is arranged on a mounting panel, the mounting panel being arranged to pivot on the cassette mount about a pivot axis; wherein the pivot axis of the mounting panel is substantially parallel to a plug-in direction of the first group of couplings.

2. The glass-fiber coupler module as claimed in claim 1, wherein each incoming patch cable is assigned a coupling in the first group.

3. The glass-fiber coupler module as claimed in claim 1 wherein all of the couplings in the first group are arranged in a row.

4. The glass-fiber coupler module as claimed in claim 1, wherein all of the couplings in the second group are arranged in a row.

5. The glass-fiber coupler module as claimed in claim 1, wherein elements for accommodating a spare working length of glass fibers are arranged beneath the mounting panel.

6. The glass-fiber coupler module as claimed in claim 5, wherein at least one direction-changing element is arranged beneath the mounting panel.

7. The glass-fiber coupler module as claimed in claim 6, wherein the direction-changing element is in the form of an inner limiter.

8. The glass-fiber coupler module as claimed in claim 7, wherein the inner limiter is provided with at least one retainer.

9. The glass-fiber coupler module as claimed claim 1, wherein cable ducts are arranged on sides of the mounting panel.

10. The glass-fiber coupler module as claimed in claim 9, wherein a width of the mounting panel with the cable ducts is less than or equal to a width of the cassette mount.

11. The glass-fiber coupler module as claimed in claim 9, wherein a connection part is arranged between the cable ducts.

12. The glass-fiber coupler module as claimed in claim 1, wherein the mounting panel to the rear of the cassette mount is provided with V-shaped extensions bent downwards.

* * * * *